June 16, 1936.  W. J. KENNEY  2,044,247
AUTOMATICALLY REGENERATING WATER·SOFTENER
Filed May 20, 1926  2 Sheets-Sheet 1
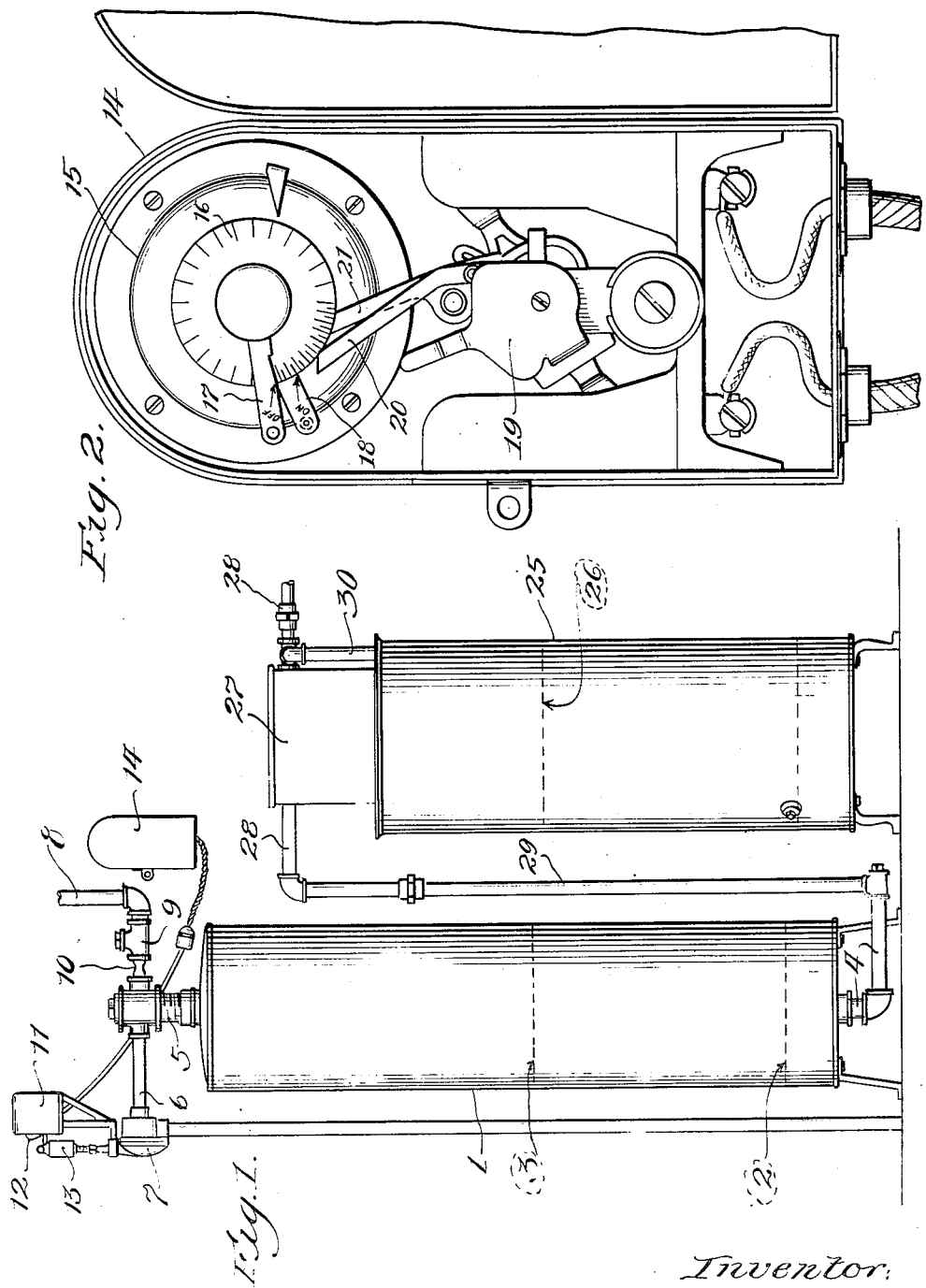

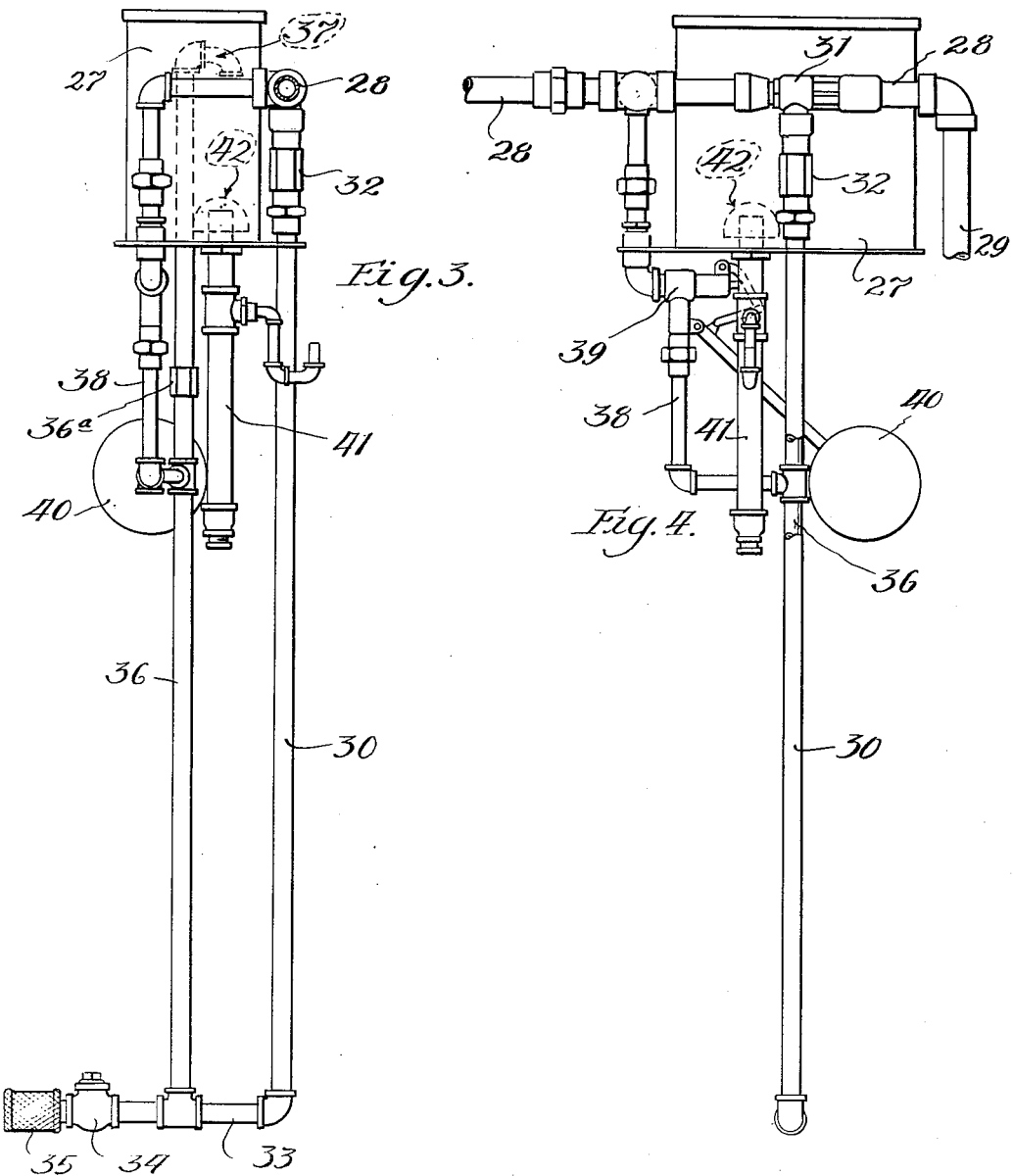

Patented June 16, 1936

2,044,247

UNITED STATES PATENT OFFICE 2,044,247

AUTOMATICALLY REGENERATING WATER SOFTENER

William J. Kenney, Chicago, Ill.

Application May 20, 1926, Serial No. 110,310

15 Claims. (Cl. 210—24)

The principal inconvenience to which the user of a zeolitic water softener is subjected is due to the necessity for regenerating the zeolitic material at comparatively frequent intervals. In the simpler form of softeners it is necessary for the user to manipulate a valve or valves when the regeneration is to start, and again to manipulate them when the regeneration has been completed. This places on the user the burden of remembering or determining the times when regeneration is necessary and then attending to the steps required to start and stop the regeneration. It has been proposed to bring about automatic regeneration whenever a predetermined amount of water has been consumed; but, under such a system, it may happen that regeneration is going on at a time it is desired to withdraw soft water.

The object of the present invention is to produce a simple and novel control system for a zeolitic water softener, whereby the regeneration will be automatically effected, but at such times and under such conditions as not to interfere with a customary withdrawal of water for use.

In carrying out my invention I make use of a brine tank and a system of valves under the master control of a clock which will cause regeneration to begin at regular intervals, say every twenty-four hours, and to continue for predetermined selected intervals, depending upon the character of the water to be treated. If an eight day clock be used, the only attention that the user need give to the system, after it has once been adjusted, is to wind the clock once a week and place salt in the brine tank at even less frequent intervals. In the ordinary household there are hours in the night during which no water is ever used for domestic purposes and, therefore, by setting the mechanism so that the regeneration will be effected during these hours, the customary use or consumption of water will never be interfered with by the process of regeneration.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of a water softening apparatus arranged in accordance with my invention; Fig. 2 is a front view, on an enlarged scale, of the time switch mechanism; and Figs. 3 and 4 are respectively side and rear views of the water measuring tank and of the piping associated with the same and with the brine tank.

In the drawings I have illustrated my invention as applied to an apparatus or system in which the water flows upwardly through the bed of zeolitic material, both during the softening process and during the process of regenerating and washing; and for the sake of brevity I shall confine the detailed description to this particular embodiment, although my invention is not limited to this specific type of softener.

Referring to Figure 1 of the drawings, 1 represents the tank or reservoir in which the softening takes place, having in the bottom a bed of gravel extending to a height indicated by the dotted line 2, and having upon the gravel a deep bed of zeolitic material extending to the level of the dotted line 3. The water, whether for the purpose of being softened, for regenerating, or for washing, enters the bottom of the tank through a pipe 4 and escapes through an outlet fitting 5 at the top. There are two lines leading from the outlet fitting, one being a waste pipe 6 containing a valve 7, and the other being a service pipe 8 containing a check valve 9 to prevent back flow. In the connection to the service pipe is a choke nozzle indicated diagrammatically by a contracted portion or neck, 10, so that water will not flow into the service line as it can be discharged through the waste pipe when the valve in the latter is opened. The valve 7 is operated by an electro-magnetic actuator 11 having a movable armature 12 that raises and lowers a valve actuating link 13. Devices of this kind are old and well known and it is therefore believed unnecessary to illustrate and describe the same in detail; it being sufficient to say that as long as current is flowing through the device 11 the valve in the waste pipe will be held open and that when the flow of current is interrupted this valve closes. The flow of current through the electro-magnetic valve actuator is controlled by a time switch 14 that may be of any of the standard devices at present on the market. The only function of the time switch is to cause the electro-magnetic valve actuator to be energized at a predetermined time, and to cause it to become deenergized after a predetermined interval of time.

A time switch suitable for my purpose is shown in Fig. 2. In a suitable casing 15 is housed the works of an eight day clock. Instead of the hands of a clock there is a graduated disc 16 that revolves once in twenty-four hours. Two switch controlling arms or fingers 17 and 18, project radially of the disc and beyond the periphery of the latter; these arms being adjustable independently of each other. Below the clock works is a switch mechanism 19, having two fingers 20 and 21 extending into the paths of the fingers 17 and 18 respectively. As the disc revolves in the counterclockwise direction, the arm 18 engages the finger 21 and the arm 17 engages the finger 20, moving these fingers toward the right. The arm 18 releases the finger 21 while the finger 20 is still in engagement with the arm 17, closing the switch and permitting current to flow to the electro-magnetic actuator 11. Then, after a predetermined time interval, the finger 20 is released from the arm 17, permitting this finger 20 to resume its initial position, as shown, and opening the switch. By shifting the arms 17 and 18 angularly of the disc, the time of the day at which the switch will be operated may be varied; and by varying the angle between the arms 17 and 18, the time during which the electro-magnetic actuator 11 will be energized, may be varied. In adjusting the mechanism initially, the arms 17 and 18 will be so disposed angularly of the disc that the circuit will be closed at some hour when there is not apt to be any consumption of water; and the angle between the arms will be made such as to give ample time for regeneration and washing while the valve in the waste pipe remains open.

Referring again to Fig. 1 of the drawings, 25 represents a brine tank that is partially filled with salt as, for example, to the level indicated by the dotted line 26. Above this tank is a small tank 27 for discharging into the brine tank a predetermined amount of fresh water, equivalent to the amount of brine used during a regenerating operation, after each regenerating operation.

The raw water, to be treated, is delivered by a supply pipe 28, shown as extending past the measuring tank and connected by a vertical pipe 29 to the inlet pipe 4 for the softening tank. The water to be softened simply flows through the pipe 28 and up through the tank 1, to be withdrawn by the service pipe 8, to supply the demand. For regenerating and subsequently washing out the brine from the softening tank, various appliances and connections are required, and these are best shown in Figs. 3 and 4.

Referring to Figs. 3 and 4, 30 represents a pipe connected at its upper end to the pipe 28 and extending down into the brine tank. At this point where the pipe 30 joins the pipe 28 is an injector device 31 similar to that shown in my prior application filed July 2, 1924, Serial No. 723,707 and, in the pipe 30, below the injector device is a check valve 32 to prevent downflow through the pipe 30. The lower end of the pipe 30 is extended laterally, as indicated at 33 and it is provided with a second check valve 34, beyond which is a strainer 35. When the valve 7 in the waste pipe is opened, the brine tank being full of brine, the flow of water through the pipe 28 will be rapid enough to induce an upward flow of brine through the pipe 30, so that the liquid flowing into the main or softening tank is a brine solution.

There is a pipe 36, terminating at its upper end in a goose neck 37 in the upper portion of the measuring tank 27 and connected at its lower end to the pipe line 30, 33 at some point between the check valves 32 and 34. This pipe 36 is connected by a branch line 38 to the pipe 28 in advance of the injector device. In the pipe 36, between the gooseneck 37 and the line 38, is a check valve 36ª. In the pipe line 38 is a valve 39 controlled by a float 40. When the float is up the valve is closed and, when the float is down the valve is open. As the regenerating process continues, brine being withdrawn from the brine tank, and no water entering the latter, the float gradually drops until it reaches its lowermost position and opens the valve 39. Water will now flow from the supply pipe 28 through the pipe line 38 and the pipe 36 to the pipe line 33, 30, so that no more brine will be drawn up through the pipe 30. Consequently only raw water will thereafter flow into the main or softening tank, washing the brine in the latter tank up and out of the same. This continues as long as the waste valve 7 is open. When the predetermined time during which the waste valve remains open has elapsed, this valve will close and no further water will be discharged from the main or softening tank, except for consumption, as it may be drawn out through the service pipe 8. As soon as the waste valve closes, the pressure of the water in the supply pipe will cause the water to flow through the pipe line 38 and up through the pipe 36 into the measuring tank. The measuring tank has a syphon device 41, provided with a trap 42 at the top, leading out of the bottom thereof. This syphon device is so constructed that the water flowing into the measuring tank through the pipe 36 and goose neck 37 is permitted to rise to a predetermined level before any of it is discharged from the tank. When the water in the measuring tank reaches this predetermined level, it is suddenly dumped through the syphoning device into the brine tank, raising the liquid level in the latter and consequently the float. As the float rises it closes the valve 39 so that no more water enters the measuring tank until after the next regenerating operation.

As softened water is consumed, the raw water flows directly from the supply pipe into the main or softening tank, without carrying with it any brine, on account of the choke 10 in the passage leading to the service line, which checks the flow of water in the supply pipe to a point insufficient to induce the suction required to raise brine through the pipe 30.

I claim:

1. In a water softening apparatus, a treating tank having a waste outlet and a service outlet, a single valve associated with said waste outlet, the parts being constructed and arranged to permit a greater flow of liquid through said valve than through said service outlet, clock controlled means to open said valve and again close it after a predetermined interval of time, a water supply pipe, a source of supply of brine, and means associated with said pipe and said source to cause a predetermined amount of brine to flow through said treating tank when said valve is open and to prevent brine from flowing when said valve is closed and the service outlet open.

2. In a water softening apparatus, a brine tank, a measuring tank above the brine tank, a supply pipe, a suction pipe for withdrawing brine from the tank, an injector at the junction of the suction pipe and the water pipe, a pipe line extending between the water pipe and the suction pipe, a valve in said pipe line, a float in the brine tank to control said valve, a branch pipe leading from said pipe line into said measuring tank, and means associated with the measuring tank for discharging its contents into the brine tank when the water in the measuring tank reaches a predetermined level.

3. In a water softening apparatus, a treating tank having an inlet and an outlet, a supply pipe for water connected to said inlet, a constantly open service pipe connected to said outlet, a waste pipe connected to said outlet, a brine tank, means connected to said supply pipe to cause brine to be drawn from the brine tank and be mixed with the water flowing toward the treating tank when the water is flowing at a predetermined rate through the supply pipe, said waste pipe being large enough to permit water to flow through said supply pipe at said predetermined rate when the waste pipe is open, the service pipe being restricted to prevent a flow through the same at said predetermined rate, and a shut-off valve in said waste pipe.

4. In a water softening apparatus, a treating tank having an inlet and an outlet, a supply pipe for water connected to said inlet, a constantly open service pipe connected to said outlet, a waste pipe connected to said outlet, a brine tank, means connected to said supply pipe to cause brine to be drawn from the brine tank and be mixed with the water flowing toward the treating tank when the water is flowing at a predetermined rate through the supply pipe, said waste pipe being large enough to permit water to flow through said supply pipe at said predetermined rate when the waste pipe is open, the service pipe being restricted to prevent a flow through the same at said predetermined rate, means for interrupting the flow of brine whenever a predetermined quantity has been withdrawn from the brine tank, a shut-off valve in the waste pipe, and a timing mechanism for opening said valve and again closing it after a predetermined interval of time.

5. In a water softening apparatus, a treating tank; a supply pipe for water, a waste pipe, and a constantly open service pipe connected to said tank; a brine tank, means associated with said supply pipe to draw into the latter a predetermined quantity of brine from the brine tank when the water flows at a predetermined rate through said supply pipe and then cause an equal quantity of water to be delivered to the brine tank, the waste pipe being of sufficient size to permit a flow through the same at said predetermined rate when open, the service pipe being restricted to prevent a flow through the same at said predetermined rate, a shut-off valve in said waste pipe, and timing mechanism to open and close said valve at successive predetermined intervals of time.

6. In a water softening apparatus, a softening tank, a brine storage receptacle, an inlet for hard water, an outlet for soft water and a waste outlet, a hydraulic differential control system, and a time operated valve in the waste line for controlling the period of softening and regenerating.

7. A controlling apparatus for a water softener consisting of a time measuring means operating a single control valve to cause a differential hydraulic system to deliver brine producing the successive steps of salting, washing and softening.

8. In a water softening apparatus, a treating tank having a waste outlet and a service outlet, a water supply pipe connected to and in constant communication with one end only of said tank, a source of supply of brine, a valve associated with said waste outlet, means including a time measuring device to open said valve and cause it to close again after it has remained open for a predetermined period of time determined and measured by said measuring device, and means adapted automatically to be set in operation by water flowing through the said supply pipe upon the opening of said valve to cause a predetermined quantity of brine to be delivered from said source into said supply pipe during a fraction of each period of time during which the valve remains open.

9. In a water softening apparatus, a treating tank having a waste outlet and a service outlet, a water supply pipe connected to and in constant communication with one end only of said treating tank, a source of supply of brine, a valve associated with said waste outlet, means to open and close said valve, and means operating automatically to cause a predetermined quantity of brine to be delivered from said source into said water supply pipe upon each opening of said valve.

10. In a water softening apparatus, a treating tank having a waste outlet and a service outlet, a water supply pipe connected to and in constant communication with one end only of said tank, a source of supply of brine, a valve associated with said waste outlet, means to open and close said valve, and means adapted to be set in operation by water flowing through the said supply pipe upon the opening of said valve to cause a quantity of brine to be delivered from said source into said supply pipe whenever the valve is opened.

11. In a water softening apparatus, a treating tank having a service outlet adapted to be connected to a service line, a water supply pipe connected to and in constant communication with one end only of said tank, a source of supply of brine, means including an injector in said supply pipe to cause a predetermined quantity of brine to be drawn from said source of supply of brine and be mixed with the water whenever water flows through said pipe at a predetermined rate, said tank having a waste outlet large enough to cause water to flow through the said pipe at or above said predetermined rate when that outlet is open, a valve for the waste outlet; and means, including a time measuring device, to open said valve and cause it to close again after a period of time measured by said time measuring device and longer than the time required to cause the aforesaid predetermined quantity of brine to be mixed with the water in said supply pipe.

12. In a water softening apparatus, a treating tank having a waste outlet and a service outlet, a valve associated with said waste outlet; clock-controlled means to operate said valve and again close it after a predetermined interval of time measured by the clock; a water supply pipe connected to and in constant communication with one end only of said treating tank, a source of supply of brine, and means associated with said pipe at said source to cause a predetermined amount of brine to flow through said pipe when said valve is open and to prevent brine from flowing when said valve is closed.

13. In a water softening apparatus, a treating tank having a waste outlet and a service outlet, a valve associated with said waste outlet; clock-controlled means to operate said valve and again close it after a predetermined interval of time; a water supply pipe connected to and in constant communication with one end only of said treating tank, a source of supply of brine, and means associated with said pipe at said source to cause a predetermined amount of brine to flow through said pipe and into the treating tank when said valve is open and to prevent brine from flowing when said valve is closed and the service outlet open.

14. In a water softening apparatus, a treating tank having a single inlet and an outlet; a supply pipe for water connected to and in constant open communication with said inlet; a service pipe connected to said treating tank connected to said outlet; a waste pipe; a valve associated with said waste outlet; a brine tank; and means controlled by said valve and connected to said supply pipe to cause brine to be drawn from the brine tank and be mixed with the water flowing toward the treating tank.

15. In a water softening apparatus, a treating tank having a single inlet and an outlet; a supply pipe for water connected to and in constant open communication with said inlet; a service pipe connected to said outlet; a waste pipe connected to said treating tank; a brine tank, means connected to said supply pipe to cause brine to be drawn from the brine tank and be mixed with the water flowing toward the treating tank; means for interrupting the flow of brine whenever a predetermined quantity has been drawn from the brine tank and cause an equal quantity of water to be delivered to the brine tank; a shut-off valve in the waste line; and a time mechanism for opening said valve and cause it to remain open during a period of time, the length of which is determined by a timing mechanism.

WILLIAM J. KENNEY.

CERTIFICATE OF CORRECTION.

Patent No. 2,044,247.  June 16, 1936.

WILLIAM J. KENNEY.

It is hereby certified that error appears in the printed specification of the above numbered patent requiring correction as follows: Page 4, first column, line 4, claim 14, strike out the words "connected to said treating tank" and insert the same after "pipe" and before the semicolon in line 5, same claim; and that the said Letters Patent should be read with this correction therein that the same may conform to the record of the case in the Patent Office.

Signed and sealed this 2nd day of February, A. D. 1937.

Leslie Frazer
Acting Commissioner of Patents.

(Seal)